Jan. 27, 1959    H. G. BUSIGNIES    2,871,476
DIRECTION FINDER
Filed Sept. 11, 1944    3 Sheets-Sheet 1

INVENTOR.
HENRI G. BUSIGNIES
BY
R P Morris
ATTORNEY

Jan. 27, 1959
H. G. BUSIGNIES
2,871,476
DIRECTION FINDER
Filed Sept. 11, 1944
3 Sheets-Sheet 2
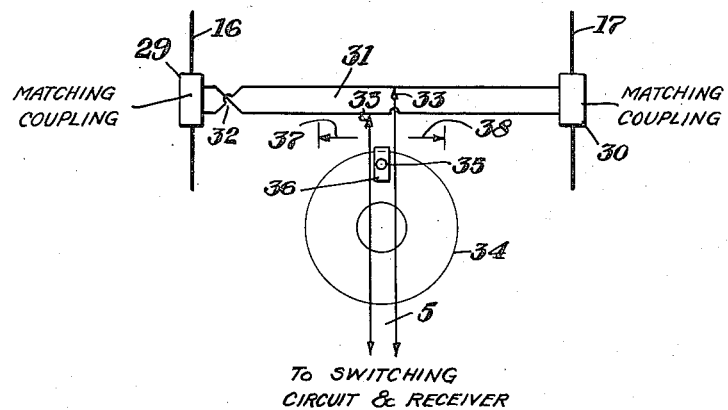
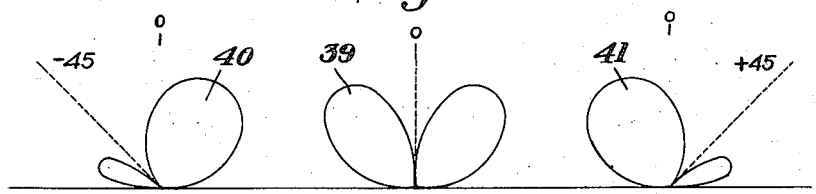
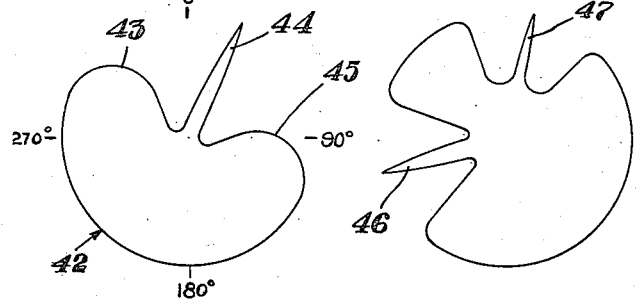
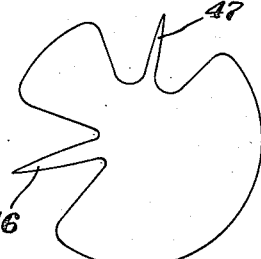
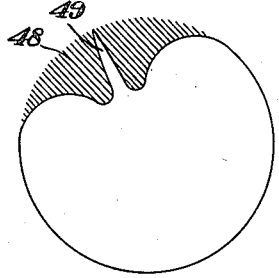
INVENTOR.
HENRI G. BUSIGNIES
BY
*R P Morris*
ATTORNEY

INVENTOR.
HENRI G. BUSIGNIES
BY
ATTORNEY

United States Patent Office 2,871,476
Patented Jan. 27, 1959

2,871,476

DIRECTION FINDER

Henri G. Busignies, Forest Hills, N. Y., assignor to International Telephone and Telegraph Corporation, a corporation of Maryland Application September 11, 1944, Serial No. 553,598

10 Claims. (Cl. 343—120)

This invention relates to direction finders and more particularly to direction finders especially useful in locations where complete rotation of a single directive pattern is not feasible.

In many installations, for example on board aircraft or ships, the metal structure of the craft is such that it is difficult to mount directive antennas in a position to permit a 360° orientation of a single directive pattern. Similarly, where broad angular coverage is desired about an intermediate position of a tall building difficulties are encountered. In such locations it then becomes necessary to provide some other type of direction finder arrangement in order to locate the direction of transmitting stations relative to the direction finder.

It is an object of my invention to provide a direction finding system for indicating the direction of a transmitting station in which a resultant sweep of a relatively broad angle is produced by a plurality of contiguous lesser angular sweeps.

It is a further object of my invention to provide a direction finding system in which an indication of direction may be obtained by sweeping the directive action of each of a plurality of directive antennas through contiguous angles to define a resultant broader arc and simultaneously to provide a sweep indication covering the entire arc, the output of the antennas being successively applied to said indicator to supply directional indications.

It is a further object of my invention to provide a phasing means for successively rotating the directive patterns of a plurality of antenna units through a given arc to provide rotation effectively through a greater arc, and successively applying the output of these antennas to an indicator to provide an indication of transmitting stations located in the angular span of any one of the antenna units.

According to a feature of my invention, a plurality of antennas capable of sweeping through given arcs such as 60° or 90°, for example, may be arranged to cover contiguous sectors of a larger arc, for example of 360°. The directive action of these antennas is preferably so timed that a complete sweep of the entire larger arc may be obtained by consecutive sweeps of the adjacent antenna units. Simultaneously with the sweeping of the directive action of the antenna units, the sweep circuit of an oscillograph indicator is controlled to produce a trace line representing the larger arc being covered. The output of the antennas is successively and cyclically applied to a receiving unit during a period in which the directive action of the corresponding antenna is being swept through the given angle. The output of the receiver is then applied to the deflecting electrodes of the oscillograph indicator to produce a deflection of the trace line in response to received signal energy. Preferably, the directive action relied upon is a null indication between two lobes and the directive action is controlled to sweep through the successive angles by means of some phasing control means.

A better understanding of my invention and the objects and features thereof may be had from the particular description of an embodiment thereof made with reference to the accompanying drawings, in which:

Fig. 2 is an illustration of the control unit applicable to each of the antennas of Fig. 1;

Fig. 3 is a graphical illustration of the radiant acting pattern of the antenna of Fig. 2 as the control is moved through a predetermined path;

Figs. 4, 5 and 6 represent direction indicating patterns which may be traced on the screen of a cathode ray oscillograph indicator.

Figure 1:
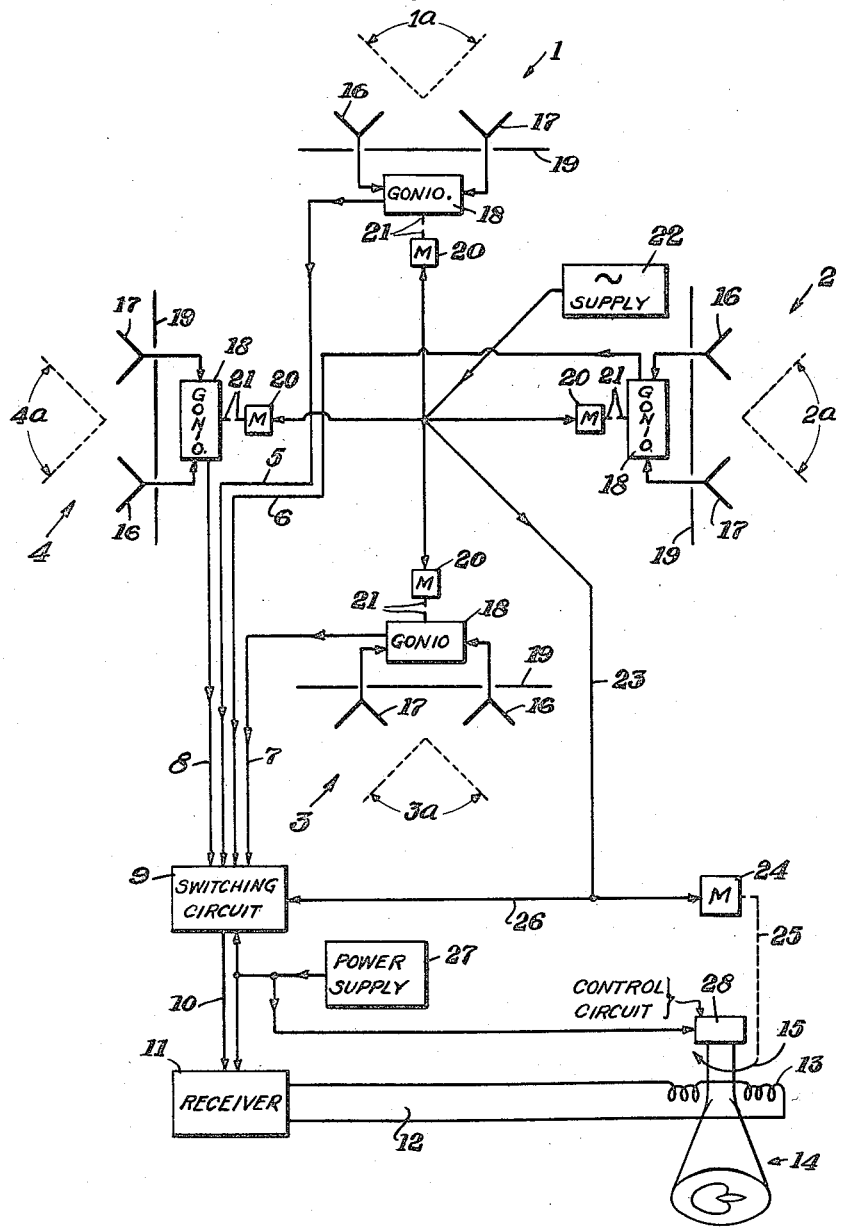
Fig. 1 is a block circuit diagram of a direction finder incorporating the features of my invention.

Turning first to Fig. 1, four directive antennas 1, 2, 3 and 4 are illustrated, these antennas being controlled to sweep their directive action through substantially 90° angles as indicated at 1a, 2a, 3a and 4a. These antennas are coupled over lines 5, 6, 7 and 8, respectively, to a switching circuit 9 which serves successively to apply received energy over line 10 to a receiver 11. The output of receiver 11 is applied over lines 12 to deflecting coils 13 of a cathode ray oscillograph. 14. Coils 13 are preferably rotated as indicated by arrow 15 about indicator 14 in synchronism with the resultant sweep of the directive pattern successively through angles 1a, 2a, 3a and 4a.

Antennas 1, 2, 3 and 4 may each comprise two antenna elements 16, 17 coupled to a goniometer element 18. Shields 19 are provided for each of the antennas to prevent interaction between the antennas and to render the antennas unidirectional goniometers or directive control units 18 are controlled by driving means, preferably synchronous motors 20, over driving connections 21. A common alternating current supply 22 serves to supply energy to each of the motors 20 and simultaneously over line 23 to motor 24 which serves through coupling link 25 to drive the indicator deflecting coils 13. Thus the trace of indicator 14 will be caused to sweep around the screen in synchronism with the effective rotation of the resultant directive pattern from the four antennas. Energy from supply source 22 is also furnished over lines 23 and 26 to switching circuit 9 so that this switching circuit will be controlled successively to couple antennas 1, 2, 3 and 4 to receiver 11 during a period corresponding to the angular sweeps of the separate directive antennas. A power supply source 27 furnishes power to switching circuit 9, receiver 11 and to the control circuit 28 of indicator 14. It will thus be seen that the direction finding unit of Fig. 1 serves to produce a trace on cathode ray indicator 14 which will indicate the direction of any incoming signals from transmitters arranged anywhere about the direction finder unit.

A better understanding of the operation of one form of goniometer unit 18, as shown in Fig. 1, may be had by reference to Fig. 2. In Fig. 2, two antenna units 16 and 17 are shown as dipole antennas coupled through impedance matching coupling devices 29, 30 and transmission line 31 to one another. A transposition is provided at 32 in line 31 so that the energy from the two antenna units 16 and 17 will be in phase opposition at the mid-point of line 31. A coupling line 5 for coupling the antenna unit to the receiver is provided at one end with sliding contacts 33 so that this coupling line may be displaced longitudinally of line 31. This displacement may take place through the medium of a disc 34 which may be driven by motor 20, Fig. 1. Disc 34 carries an eccentric pin 35 and a block 36 which serves upon rotation of disc 34 to shift contacts 33 of line 5 backwards and forwards between the limits indicated by arrows 37, 38. As the transmission line connections are shifted, the angle at which a zero or null signal is perceived is similarly shifted. Thus at the mid-point, the resultant effective pattern may be as shown at 39 of Fig. 3. At the extreme left the resultant pattern may be as shown at 40 of Fig. 3 and at the extreme right as shown at 41. It will thus be seen that as the position of contacts 33 is varied along line 31, the null will be shifted between −45 and +45 degrees thus covering a span of 90°. For a more complete disclosure of the phase shifting goniometer of the type illustrated in Fig. 2, reference may be had to the copending application of Nathan Marchand, Serial No. 553,562 filed September 11, 1944, now Patent No. 2,640,192 issued May 26, 1953.

It will be clear that the arrangement as shown in Fig. 2 may be applied to each of the antennas 1, 2, 3 and 4 of Fig. 1. The corresponding discs 34 may be continuously operated on all four of these antennas and are preferably arranged so that the sweep of the next successive antenna will begin substantially at the same point where the corresponding sweep of the next preceding antenna has been discontinued. A slight overlap between successive patterns may be desirable to insure that no gaps are left therebetween. Because of switching circuit 9, each antenna will be effective to pass energy to receiver 11 only during the time when it is sweeping through one 90° arc. If six antennas are used, the corresponding arcs will be reduced to substantially 60° each and so on so that the sweep of the arc to be used will be determined by the number of antenna units provided. Similarly, the angular sweep is adjusted with respect to the number of antennas used to cover the desired total arc.

A direction finder of this type is precisely accurate for signals incoming in the horizontal plane. When energy comes in at a vertical angle, a slight error is introduced. However, for the usual low angle received signals the error is negligible.

In Fig. 4 is shown a typical pattern produced on the indicator by energy from a single transmitting station. Preferably the indicator 14 is arranged so that, in the absence of signal, the beam will trace a circle and will be deflected inwardly in response to received signals by an amount dependent upon the strength of the received signal. Thus the pattern shown in Fig. 4 will be substantially zero for a large portion of its sweep as indicated at 42. When the energy is received, the sweep will be deflected inwardly as shown at 43 until such time as the null of the sweep pattern is reached at which time the trace line will again deflect outwardly as shown at 44 after which it will again be deflected inwardly as at 45. Thus by the use of the null type of radiation pattern, a sharp indicating pointer is provided at 44.

In Fig. 5 is shown a pattern similar to that of Fig. 4 except that in this case two transmitter stations are indicated as shown at 46 and 47.

In Fig. 6 is disclosed a type of pattern which would be produced if the transmitting station is sending out a plurality of spaced pulse signals instead of a steady radio frequency. In this case, the beam will trace a clear circle so long as no energy is being received. Upon receipt of energy, however, the beam will trace a series of lines as indicated by the shaded area 48 returning to the outer surface of the screen at each interval between the received pulses. However, at the null indicating position, a zero signal will be again received so that a clear pointer 49 will also be indicated.

Figure 7:
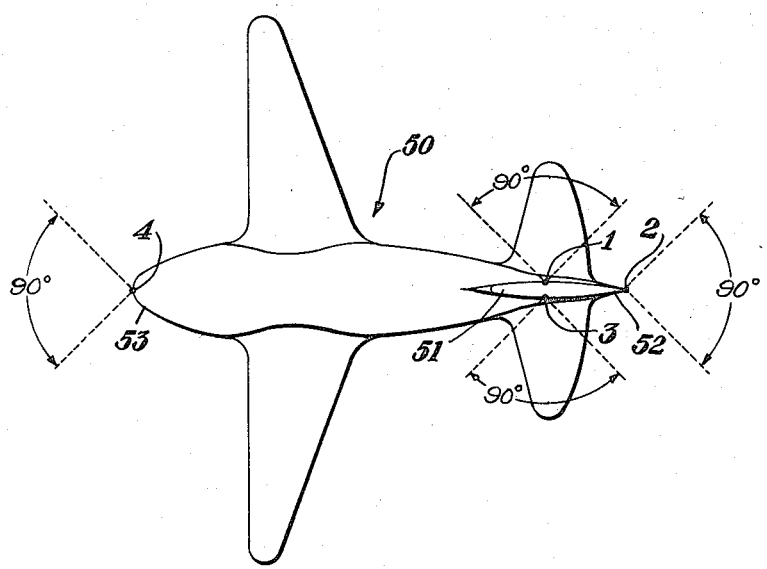
Figs. 7 and 8 illustrate possible locations for the various antennas of the direction finder applied to aircraft.
Figure 8:
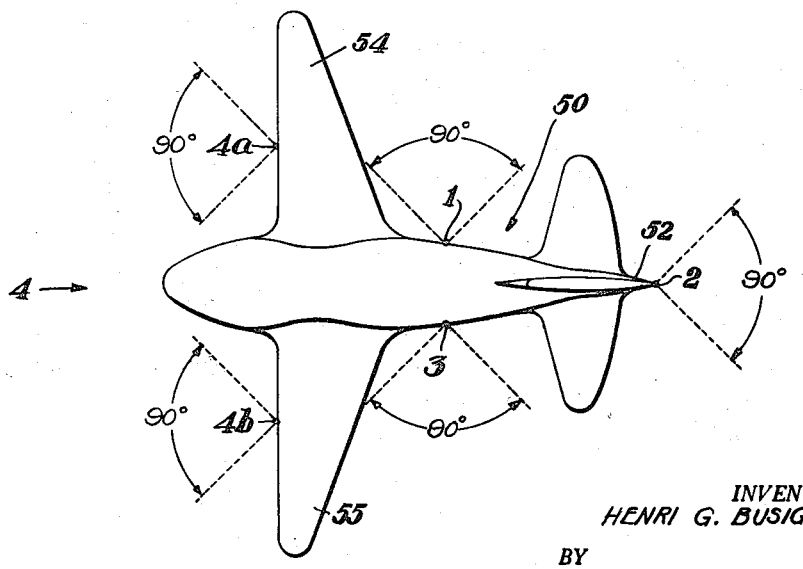

In Fig. 7 is shown an aircraft 50 on which the four antennas such as shown in Fig. 1 may be mounted. In this arrangement, antennas 1 and 3 are mounted on opposite sides of the stabilizer 51, antenna 2 is mounted in the tail 52 of the plane and antenna 4 is mounted at the nose 53 of the plane. Fig. 8 shows another possible arrangement of symmetrical antenna units applied to a plane 50. In this arrangement, antennas 1 and 3 are mounted on opposite sides of the fuselage back of wings 54 and 55, antenna 2 is again mounted at the tail surface 52 while antenna 4 is mounted in two sections 4a and 4b on oppositely disposed wings 54 and 55. In this case, antennas 4a and 4b are simultaneously to be swept through the same angle 90° and also will simultaneously be coupled to the receiver unit.

While I have illustrated my invention in a particular circuit arrangement utilizing phase shift goniometers and null indications, it should be understood that this is made merely by way of illustration. The resultant rotary signal may be obtained by other types of directive antennas and different forms of directional characteristics. The illustration is therefore not to be considered as a limitation on my invention as set forth in the objects thereof and the accompanying claims.

I claim:

1. A direction finder for indicating the direction of transmitting stations within a given arc, comprising means for producing a plurality of different directive radiant acting receiver patterns, means for successively sweeping the directive effect of each of said patterns successively through given contiguous angles to define together said given arc, means for producing in synchronism with said sweeping an indicator trace representing successive of said contiguous angles to provide a trace representing said arc, and means for applying received energy from each of said directive patterns during its respective sweeping period to said indicator to produce deflections of said trace to indicate the directive position of transmitting stations within said arc.

2. A direction finder system for indicating the direction of transmitting stations within a given arc, comprising a plurality of differently directional antennas each having a given directional characteristic, means for controlling each of said directional antennas to successively sweep said directional characteristics through contiguous portions of said given arc, an indicator having an indicator sweep for providing a sweep line, means for timing said sweep line with the resultant sweep of each of said antennas over said given arc, a receiver, means for successively coupling each of said antennas to said receiver during its period of said successive sweeps, and means for applying the output of said receiver to said indicator to produce a deflection of said sweep line in response to received signals.

3. A direction finder system comprising a plurality of unidirectional antennas each having a different single directional characteristic, means for controlling each of said antennas to successively sweep the directional characteristics of successive antennas through predetermined angles to provide a resultant sweep through an angle substantially equal to the sum of said predetermined angles, a receiver circuit having an input and an output, means for cyclically coupling said antennas in succession to said receiver in time relation with respect to said successive sweeps, an indicator, a sweep circuit for said indicator for sweeping an indicator line over said indicator, means for timing said sweep circuit with said resultant sweep, and means for applying the output energy from said receiver to said indicator to produce deflections of said sweep line in response to said output energy, whereby the angular position of a transmitter with respect to said direction finder system may be indicated.

4. A direction finder system comprising a plurality of directive antennas each arranged to produce radiation patterns having a single differently directive characteristic, control means for continuously sweeping said characteristics through predetermined angles such that they define a substantially 360° arc, a receiver means, switching means for cyclically coupling successive ones of said antennas to said receiver means for a period corresponding to the time the corresponding antenna is being swept through said predetermined angle, an oscillograph indicator, means for sweeping the beam of said oscillograph over a predetermined sweep path during the time said 360° arc is being swept by said antennas, and means for coupling said receiver means to said oscillograph to provide deflections of said sweep beam in response to received signals.

5. A direction finder according to claim 4 wherein said antennas each comprise a pair of antenna elements, an antenna line for coupling said elements together in phase opposition, and a reflector for said antennas, and said control means comprises a lead line coupled to said antenna line, and means for cyclically shifting the coupling point of said lead line with respect to said antenna line whereby a single null directive characteristic is shifted between predetermined angles.

6. A direction finder system comprising a plurality of differently directive antennas arranged about a given point each having its directive action outwardly from said point, control means for controlling the directive action of each of said antennas to sweep it through a given angle whereby said antennas cover a resultant 360° angle sweep about said point, synchronous drive means for driving said control means in synchronism, an indicating oscillograph having an indicating beam, means for moving said beam to produce a trace line in synchronism with said 360° sweep, a receiver circuit having its output circuit coupled to said indicator to produce deflections of said beam effective on said trace in response to received signals, and a switching circuit for successively coupling said antennas to said receiver for a period substantially equal to the time the corresponding directive action is being swept through its given angle.

7. A direction finder according to claim 6 wherein each of said antennas comprises a pair of spaced elements having the same directivity, means for effectively sweeping the directivity of each of said pair of elements successively, and means for shielding said antennas from one another to separate the directive radiation patterns.

8. A direction finder according to claim 6 wherein the indicating directive action of each of said antennas comprises a null signal indication.

9. A direction finder according to claim 6 wherein said antennas each comprises two antenna elements interconnected to provide a null directive pattern indication, and said control means comprises a phasing means for effectively shifting the position of said null through said given angle.

10. A direction finder for indicating the direction of transmitting stations within a given arc, comprising means for producing a plurality of differently directive radiant acting receiver patterns, means for successively sweeping the directive effect of each of said patterns successively through given contiguous angles to continuously define together said given arc, a translating device, means for successively coupling an antenna to said translating device during its respective sweeping period, and means for producing an indication of received signals coupled to said translating device.

References Cited in the file of this patent

UNITED STATES PATENTS

| | | |
|---|---|---|
| 1,471,165 | Israel | Oct. 16, 1923 |
| 1,806,755 | Hansell | May 26, 1931 |
| 1,821,386 | Lindenblad | Sept. 1, 1931 |
| 2,082,347 | Leib et al. | June 1, 1937 |
| 2,189,549 | Hershberger | Feb. 6, 1940 |
| 2,208,378 | Luck | July 16, 1940 |
| 2,388,262 | Ganiayre | Nov. 16, 1945 |
| 2,427,660 | Colton et al. | Sept. 23, 1947 |
| 2,430,296 | Lewis | Nov. 4, 1947 |

FOREIGN PATENTS

| | | |
|---|---|---|
| 818,131 | France | June 7, 1937 |
| 526,658 | Great Britain | Sept. 23, 1940 |